US007481133B2

(12) United States Patent
Walravens et al.

(10) Patent No.: US 7,481,133 B2

(45) Date of Patent: Jan. 27, 2009

(54) AUXILIARY OPERATING DEVICE FOR ALLOWING MANUAL OPERATION OF A CLOSURE NORMALLY DRIVEN BY A MOTOR

(75) Inventors: Christophe Walravens, Mercier (CA); Daniel Lelièvre, St-Eustache (CA); Christian Claudel, Montréal (CA)

(73) Assignee: Manaras Somfy ULC, Pointe Claire, Quebec (CA)

(*) Notice: Subject to any disclaimer, the term of this patent is extended or adjusted under 35 U.S.C. 154(b) by 326 days.

(21) Appl. No.: 10/829,253

(22) Filed: Apr. 22, 2004

(65) Prior Publication Data

US 2004/0211279 A1 Oct. 28, 2004

(30) Foreign Application Priority Data

Apr. 23, 2003 (CA) .................................... 2426369

(51) Int. Cl.
*F16K 31/05* (2006.01)

(52) U.S. Cl. ............................ 74/625; 49/139; 49/140

(58) Field of Classification Search ................... 74/405, 74/417, 89.22, 625; 49/139, 140; 160/310, 160/133, 188, 189; 251/129.03, 294, 289
See application file for complete search history.

(56) References Cited

U.S. PATENT DOCUMENTS

| | | | | |
|---|---|---|---|---|
| 2,435,122 | A * | 1/1948 | Berndt | 476/56 |
| 2,755,081 | A * | 7/1956 | Johnson et al. | 160/188 |
| 3,166,306 | A * | 1/1965 | Peltier | 160/188 |
| 4,472,910 | A * | 9/1984 | Iha | 49/139 |
| 4,560,046 | A * | 12/1985 | Lorello et al. | 192/224.1 |
| 5,222,327 | A * | 6/1993 | Fellows et al. | 49/139 |
| 5,839,555 | A * | 11/1998 | Hsieh | 192/223.1 |
| 6,092,582 | A * | 7/2000 | Liu | 160/310 |
| 6,381,903 | B1 * | 5/2002 | Desrochers et al. | 49/139 |
| 6,534,941 | B2 * | 3/2003 | Desrochers et al. | 318/466 |
| 6,739,372 | B2 * | 5/2004 | Mullet et al. | 160/189 |
| 2002/0111242 | A1 * | 8/2002 | Balli et al. | 475/149 |

FOREIGN PATENT DOCUMENTS

| | | | |
|---|---|---|---|
| CA | 2112350 | | 2/2000 |
| CA | 2297220 | | 3/2001 |
| CA | 2297220 | A1 * | 3/2001 |

* cited by examiner

*Primary Examiner*—Richard W Ridley
*Assistant Examiner*—Terence Boes
(74) *Attorney, Agent, or Firm*—Ogilvy Renault LLP

(57) ABSTRACT

An auxiliary operating device for manually operating a normally motor-operated closure between open and closed positions, the device comprising a shaft, a driving member mounted to the shaft and displaceable between an idle position and an operational position wherein the driving member is operatively coupled to the closure. The device further comprises a manual actuator for first displacing the driving member from its idle position to its operational position and then driving the driving member in order to displace the closure. The actuator can be advantageously mounted at either end portions of the shaft irrespectively of the position of the driving member on the shaft.

13 Claims, 6 Drawing Sheets

AUXILIARY OPERATING DEVICE FOR ALLOWING MANUAL OPERATION OF A CLOSURE NORMALLY DRIVEN BY A MOTOR

BACKGROUND OF THE INVENTION

1. Field of the Invention

The present invention relates to the operation of a closure normally operated by a motor and, more particularly, to an auxiliary device for allowing manual operation of the closure.

2. Description of the Prior Art

It is well known in the art of closures operated by way of electric motors to provide each system with an auxiliary operating device to permit manual operation of the closure in the event, for instance, of a failure of the electric motor.

Canadian Patent No. 2,112,350 issued on Feb. 22, 2000 in the name of Manaras et al. discloses such an auxiliary closure operating device which is mounted on a motor driving an output shaft adapted to open and close a closure, such as a garage door. The auxiliary operating device comprises a shaft mounted for rotational and axial movements within an elongated surrounding sleeve supported on the motor. A first gear is mounted at a first end of the shaft for rotation therewith. In its idle position, the first gear is engaged by a locking finger in order to prevent rotational movement of the shaft. A pulley is mounted for free rotation at the opposed end of the shaft and is engaged with a manual chain. A disc is mounted to the hub of the pulley for engaging a cam member fixedly mounted to the shaft adjacent the pulley. The initial rotational movement induced to the pulley via the manual operation of the chain causes the disc to displace along the cam member so as to push the latter away from the pulley, thereby causing the shaft, which is locked against rotation due to the engagement of the locking finger with the first gear, to slide axially within the sleeve. At one point, the first gear will disengage from the locking finger and will mesh with a second gear secured to the output shaft, thereby allowing the shaft to rotate with the cam member in order to drive the output shaft. At the same time, the disc will engage a stopper on the cam member such that further rotation of the pulley will be transmitted as a torque to the cam member, thereby causing the rotation of the shaft and of the first gear and, thus, of the second gear and of the motor's output shaft.

Canadian Patent Application No. 2,297,220 published on Mar. 15, 2001 discloses a more compact auxiliary operating device wherein the manually actuated pulley is directly mounted on the shaft normally driven by the motor. The pulley has an axially extending hub fitted with a roller mounted on a radially extending idle axle. The roller travels on a cam surface of a cam mounted on the normally motor-driven shaft. The action of the roller on the cam causes the cam to move axially on the shaft towards a spring pin extending radially from the shaft. The engagement of the cam with the spring pin permits to transmit a torque from the pulley to the shaft via the cam.

One problem with the two above-described auxiliary operating devices resides in the lack of flexibility that they offer during installation. For instance, if the device has been configured to be installed on the right side of a closure and that once on site the technician realized that the device can only be mounted on the left side of the closure, then the device must be completely disassembled and reconfigured to permit the installation thereof on the left side of the closure.

SUMMARY OF THE INVENTION

It is therefore an aim of the present invention to provide a new auxiliary operating device that can be easily and readily reconfigured to be installed on either side of a mechanically operated overhead door.

Therefore, in accordance with the present invention, there is provided an auxiliary operating device for manually operating a normally motor-operated closure between open and closed positions, the device comprising a shaft, a driving member mounted to said shaft and displaceable between an idle position and an operational position wherein the driving member is operatively coupled to the closure, and a manual actuator for first displacing said driving member from said idle position to said operational position and then driving said driving member in order to displace the closure, wherein said actuator is selectively mountable at either end portions of said shaft irrespectively of the position of said driving member on said shaft.

In accordance with a further general aspect of the present invention, there is provided an auxiliary operating device for manually operating a normally motor-operated closure between open and closed positions, comprising a support, a shaft mounted to said support for axial and rotational movement, a driving member mounted to said shaft for joint movement therewith, said driving member being movable between an idle position and an operational position wherein the driving member is operatively coupled to the closure, a manual actuator for driving said shaft in rotation, a cam cooperating with a cam engaging member for axially displacing said shaft with said driving member as a result of a rotation imparted to said shaft by said manual actuator, and a clutch for temporarily drivingly disconnecting said shaft from one of said cam and said cam engaging member while allowing both said cam and said cam engaging member to rotate with the shaft once said driving member assumes said operational position thereof.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
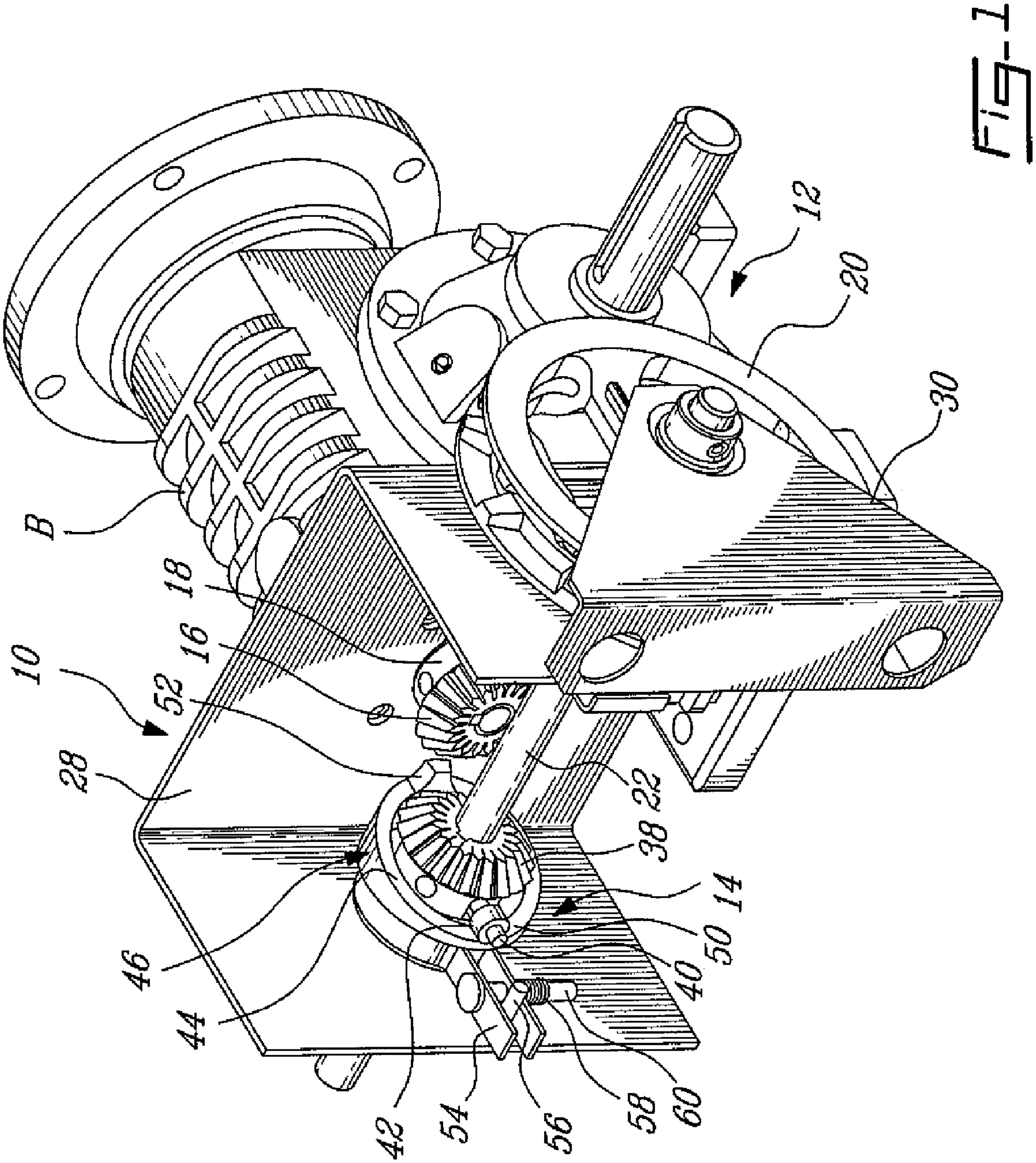
FIG. 1 is a perspective view of an auxiliary operating device that can be used to manually open and close a normally motor-driven overhead closure, such as a garage door, in accordance with a first embodiment of the present invention.
Figure 2:
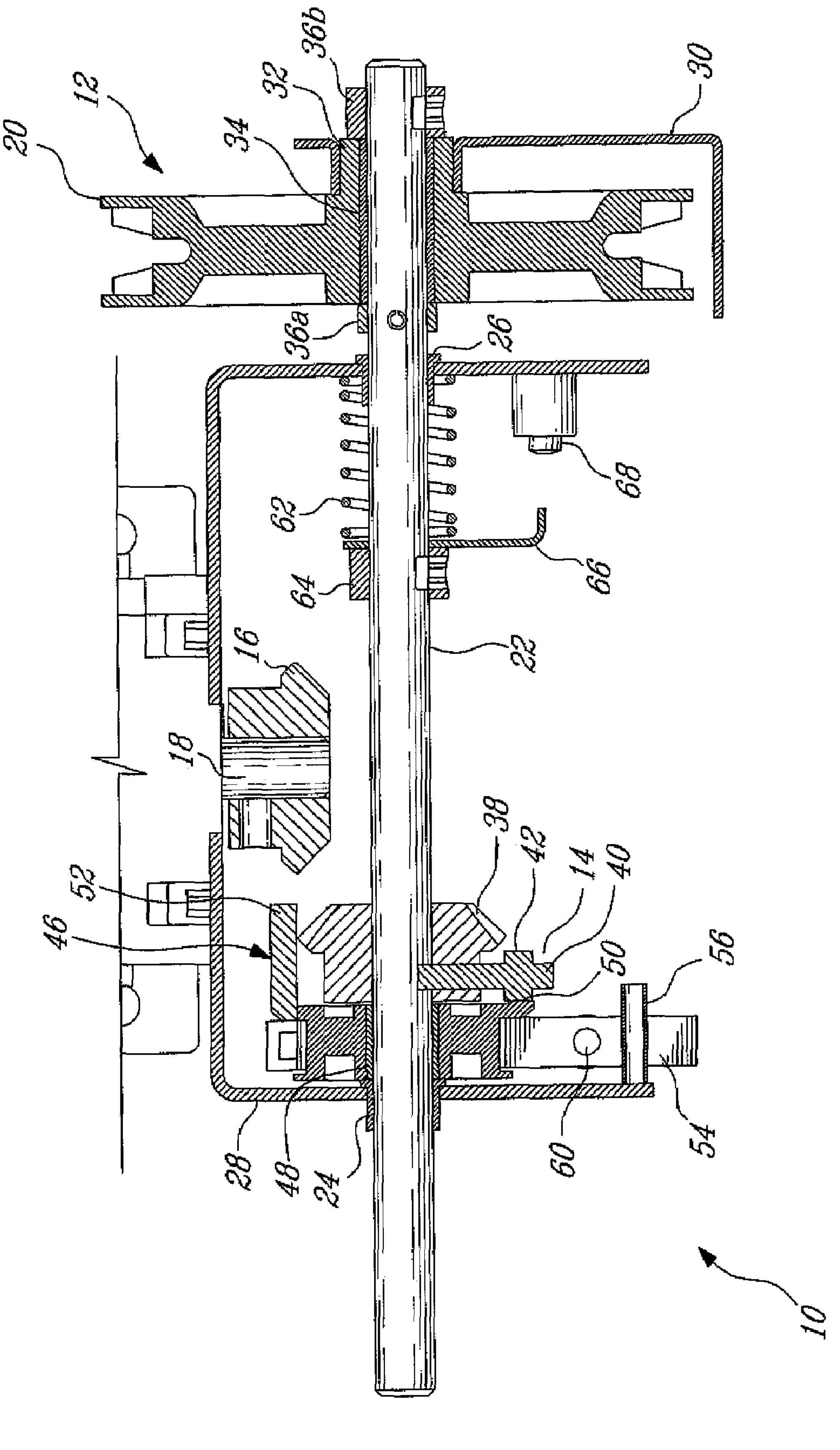
FIG. 2 is a longitudinal cross-sectional view of the auxiliary operating device.

In accordance with an embodiment of the present invention, FIGS. 1 and 2 illustrate an auxiliary operating or override device 10 that can be manually operated for displacing a closure (not shown), which is normally operated by an electric motor via a gear box B, between an open position and a closed position. The auxiliary operating device 10 is particularly suited for manually operating normally mechanically operated overhead doors, such as garage doors.

As will be seen hereinafter, the auxiliary operating device 10 can be easily reconfigured on site to allow the actuator to be installed on the right or left side of the operator depending on the overhead closure configuration.

As shown in FIGS. 1 and 2, the auxiliary operating device 10 generally comprises an actuator 12 adapted to be manually operated to first operatively engage a driving member 14 with a bevel gear 16 and then drive the bevel gear 16 in order to lower or raise the closure which is operatively coupled to the shaft 18 on which the bevel gear 16 is mounted.

The actuator 12 includes an endless chain (not shown) extending over a pulley 20 mounted on a shaft 22, which extends through a pair of axially aligned bushings 24 and 26 (FIG. 2) received in respective holes defined in the side walls of a C-shaped mounting structure 28. The C-shaped mounting structure 28 is preferably provided in the form of a bent plate.

The chain extends downwardly on both sides of the pulley 20 through a chain guide 30 mounted on an axially extending cylindrical hub extension 32 of the pulley 20 (see FIG. 2).

As shown in FIG. 2, the hub of the pulley 20 is mounted on a bushing 34 fitted on the shaft 22 between a pair of collars 36*a*, 36*b* secured to the shaft 22. It is noted that the bushing 34 is optional, the ony requirement being that the pulley be secured to the shaft 22. This arrangement allows the shaft 22 to be driven by simply pulling on the chain engaged with the pulley 20.

The driving member 14 includes a bevel gear 38 fixedly mounted to the shaft 22 by means of a radially extending pin 40. A roller 42 is provided at the free distal end of the pin 40 for rolling engagement on a circumferentially extending cam surface 44 of a cam member 46 mounted on a bushing 48 fitted on the shaft 22. It is noted that the roller 42 does not necessarily have to be mounted to the bevel gear 38 but could be mounted at another location on the shaft 22 as well. The cam surface 44 extends circumferentially from a shallow valley 50 to a stopper or peak formation 52 with is diametrically opposite to the valley 50. It is noted that peak formation 52 and the shallow valley could be otherwise symmetrically disposed.

A spring blade 54 is received in a circumferential groove defined in the periphery of the cam member 46 and has opposed ends thereof engaged with opposed sides of an anti-rotation pin 56 extending inwardly from the mounting structure 28 in a direction parallel to the shaft 22. A compression spring 58 (FIG. 1) fitted about a bolt 60 engaged with the opposed ends of the spring blade 54 is provided to adjust the tension on the cam member 46. It is noted that an axial frictional system could be used instead of the above-described radial frictional system for preventing the cam member 46 from rotating with the shaft 22 before the driving gear 38 is engaged with the driven gear 16.

Figure 3:
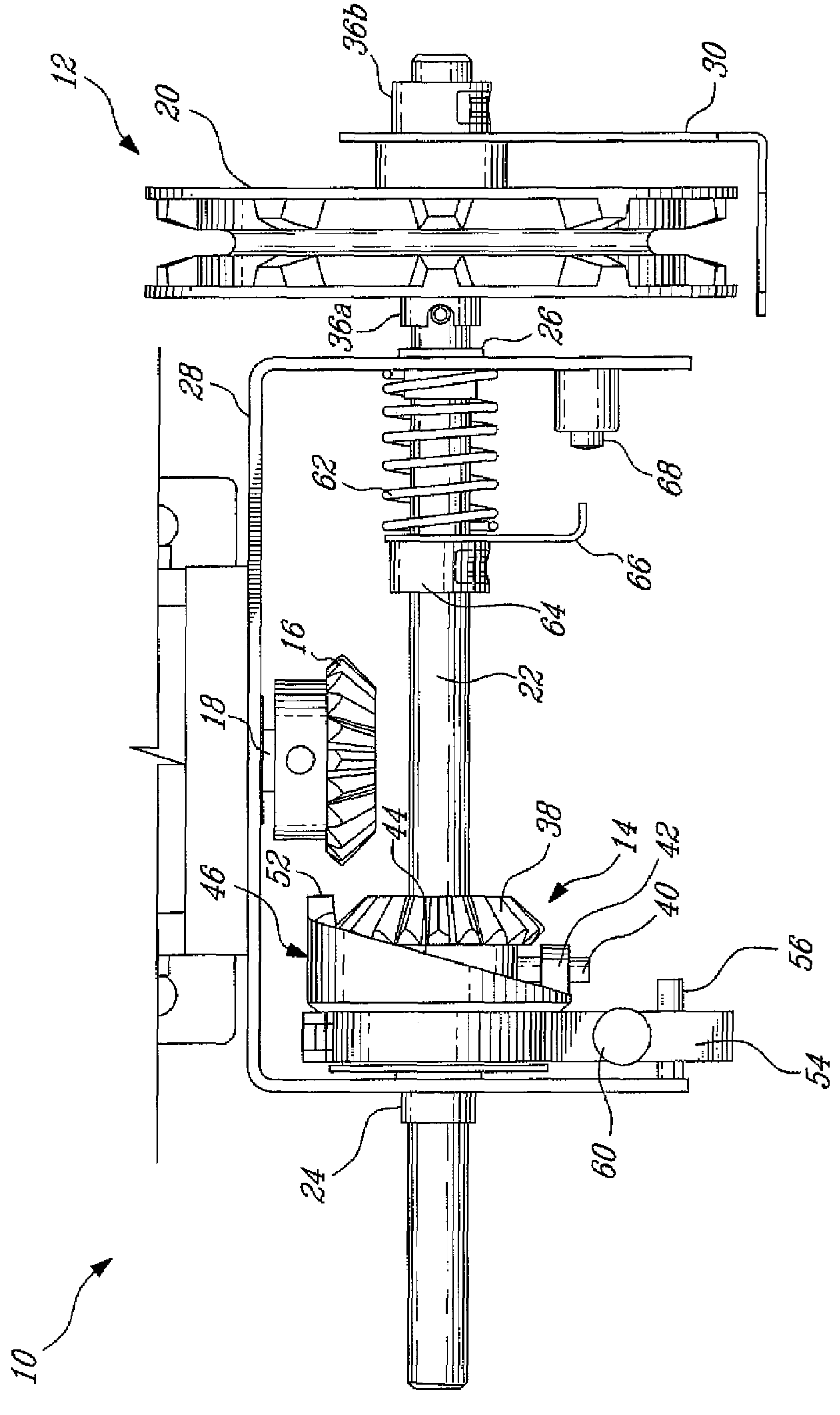
FIGS. 3 to 5 are top views of the auxiliary operating device illustrating how the driving component of the device is displaced from an idle position to an operational position.
Figure 5:
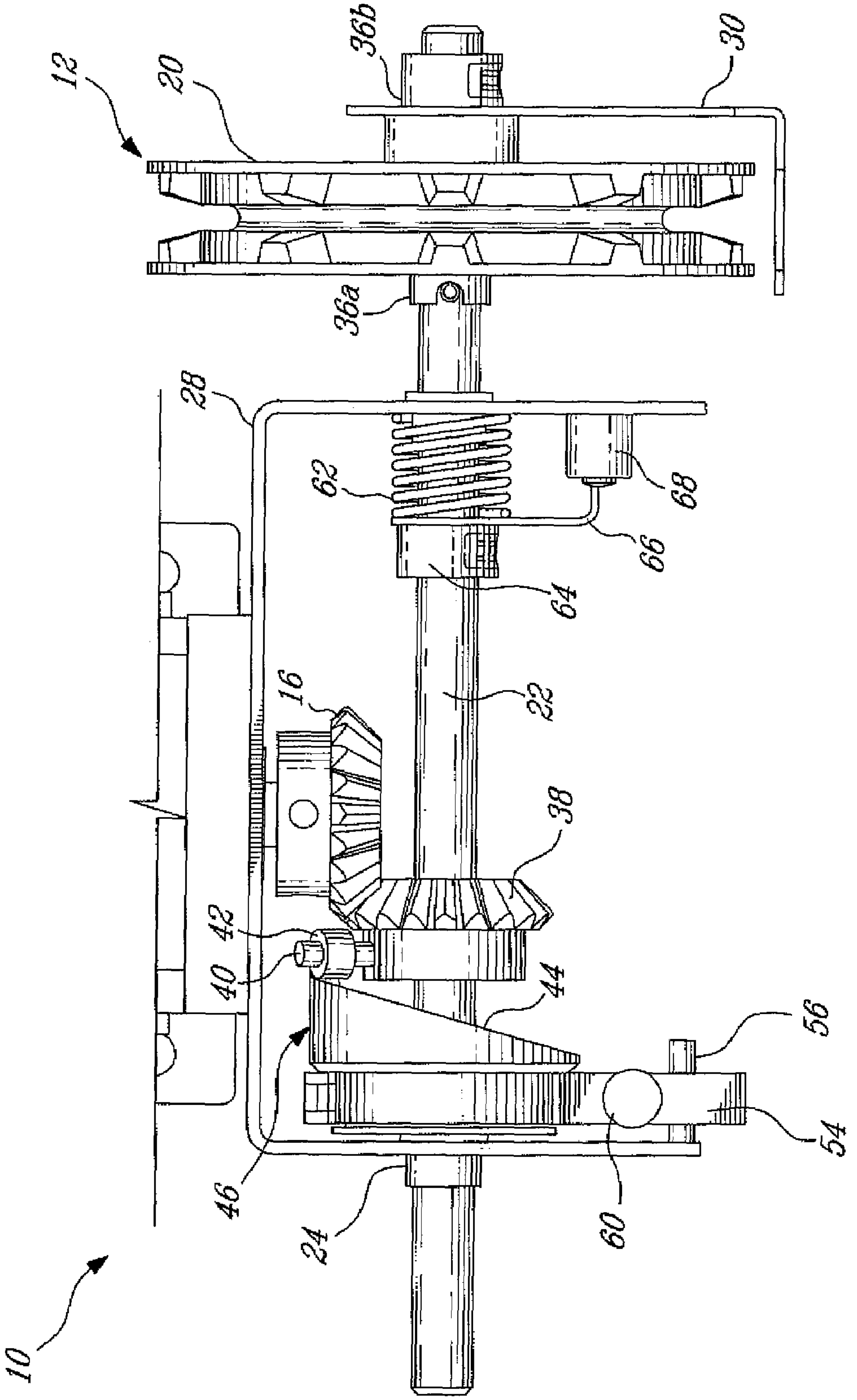

A compression spring 62 extends between the inner surface of one side wall of the mounting structure 28 and a collar 64 secured on the shaft 22. The compression spring 62 could be installed in other ways to achieve the same result. The spring 62 pushes on the collar 64 and, thus, on the shaft 22 to bias the driving gear 38 to its idle position, as shown in FIGS. 2 and 3. A finger 66 is mounted on the shaft 22 between the spring 62 and the collar 64 for triggering a switch 68 when the driving gear 38 reaches its operational position, as shown in FIG. 5. The finger 66 could be mounted in different ways as long as it does not rotate with the shaft 22 while being axially moveable therewith. By triggering the switch 68, the finger 66 automatically cuts power to the motor M, thereby preventing powering of the motor while the closure is being manually operated.

Figure 4:
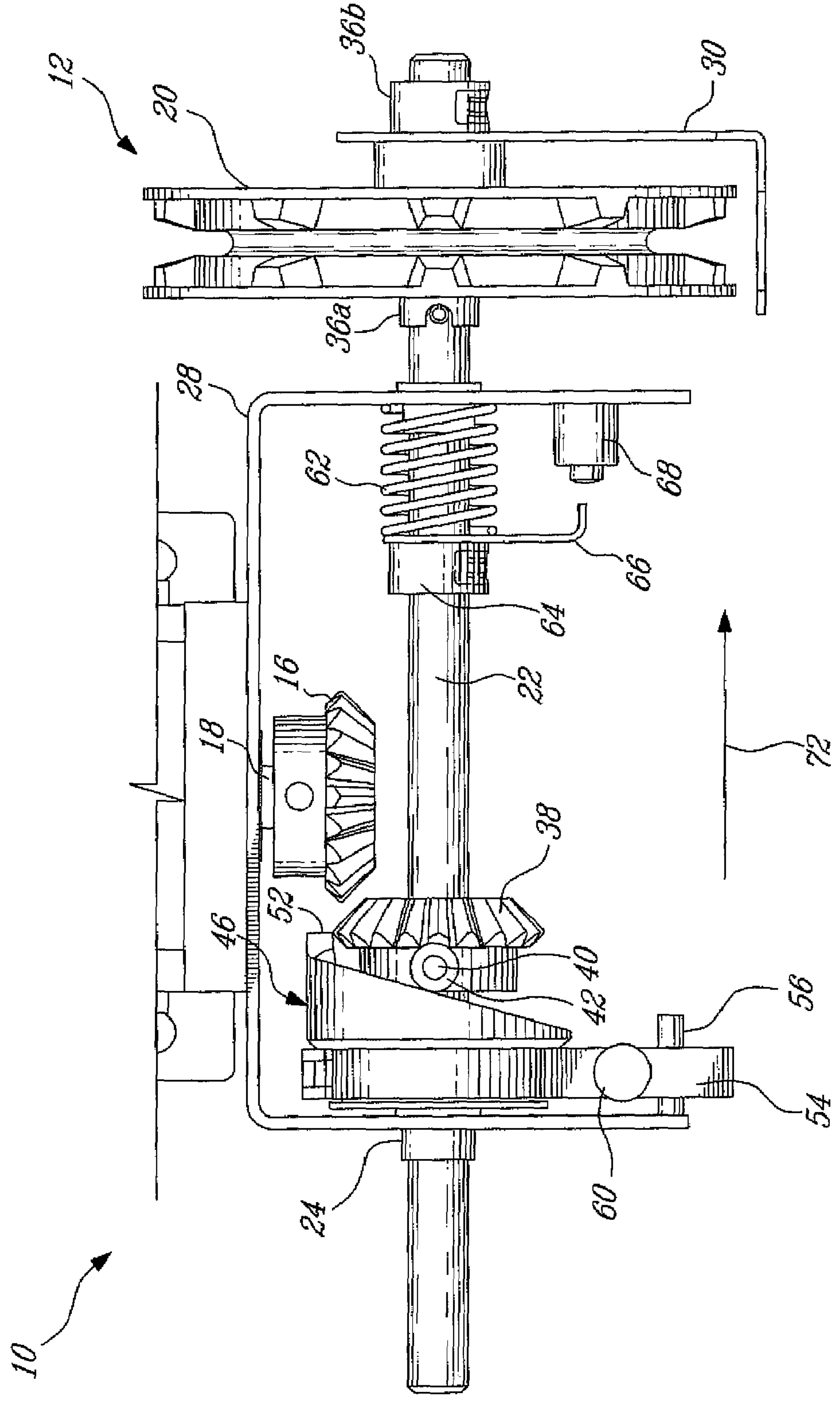

FIGS. 3 to 5 illustrate the operation of the device 10. When it is desired to manually operate the closure, one has solely to pull on the manual chain, thereby causing the shaft 22 and, thus, the driving gear 38 to rotate jointly with the pulley 20. However, the cam member 46 will remain stationary because of the frictional forces exerted thereon by the spring blade 54. The relative rotational movement between the driving gear 38 and the cam member 46 will cause the roller 42 to travel on the cam surface 44 from the shallow valley 50 towards the peak formation 52. As a result, the shaft 22 as well as the elements fixedly mounted thereon, namely the driving gear 38 and the finger 66 will be moved axially to the right against the compression spring 62, as depicted by arrow 72 in FIG. 4.

Continuous rotation of the pulley 20 will eventually cause the roller 42 on the driving gear 38 to reach the peak formation 52, as shown in FIG. 5. At this point, the driving gear 38 is in meshing engagement with the bevel gear 16 and the finger 66 has already triggered the switch 68 in order to cut power to the motor. After the gears 16 and 38 have been brought in meshing engagement, as shown in FIG. 5, further rotation of the pulley 20 will cause the cam member 46 and the driving member 14 to rotate jointly by overcoming the friction forces exerted on the cam member 46 by the spring blade 54. Accordingly, there will be a sliding movement between the spring blade 54 and the cam member 46. The joint rotation of the cam member 46 and the driving gear 38 at this stage will ensure the integrity of the meshing engagement between the driving gear 38 and the driven gear 16. Therefore, the rotation imparted to the shaft 22 and, thus, the driving gear 38, by the pulley 20 will be transmitted to the driven gear 16 and its associated shaft 18 in order to operate the closure. All of the above steps are performed by simply pulling on the chain engaged with the pulley. All the steps are, thus, done in a single operation.

By releasing the chain extending over the pulley 20, the forces on the spring 62 will be released, and the latter will pushed on the collar 64 to axially move the driving gear 38 back to its idle position shown in FIG. 3.

The fact that the pulley 20 is structurally isolated from the cam 46, the roller 42 and the driving gear 38 allows the device 10 to be readily reconfigurable for installation on either side of the operator. Indeed, one has simply to remove the pulley 20 from one end of the shaft 22 and installed it back on the opposed end of the shaft 22 to convert the device from a right hand side mountable device to a left hand side mountable device. As opposed to known prior devices, the technician has solely to change the position of the pulley on the shaft without modifying the remaining parts of the system.

Figure 6:
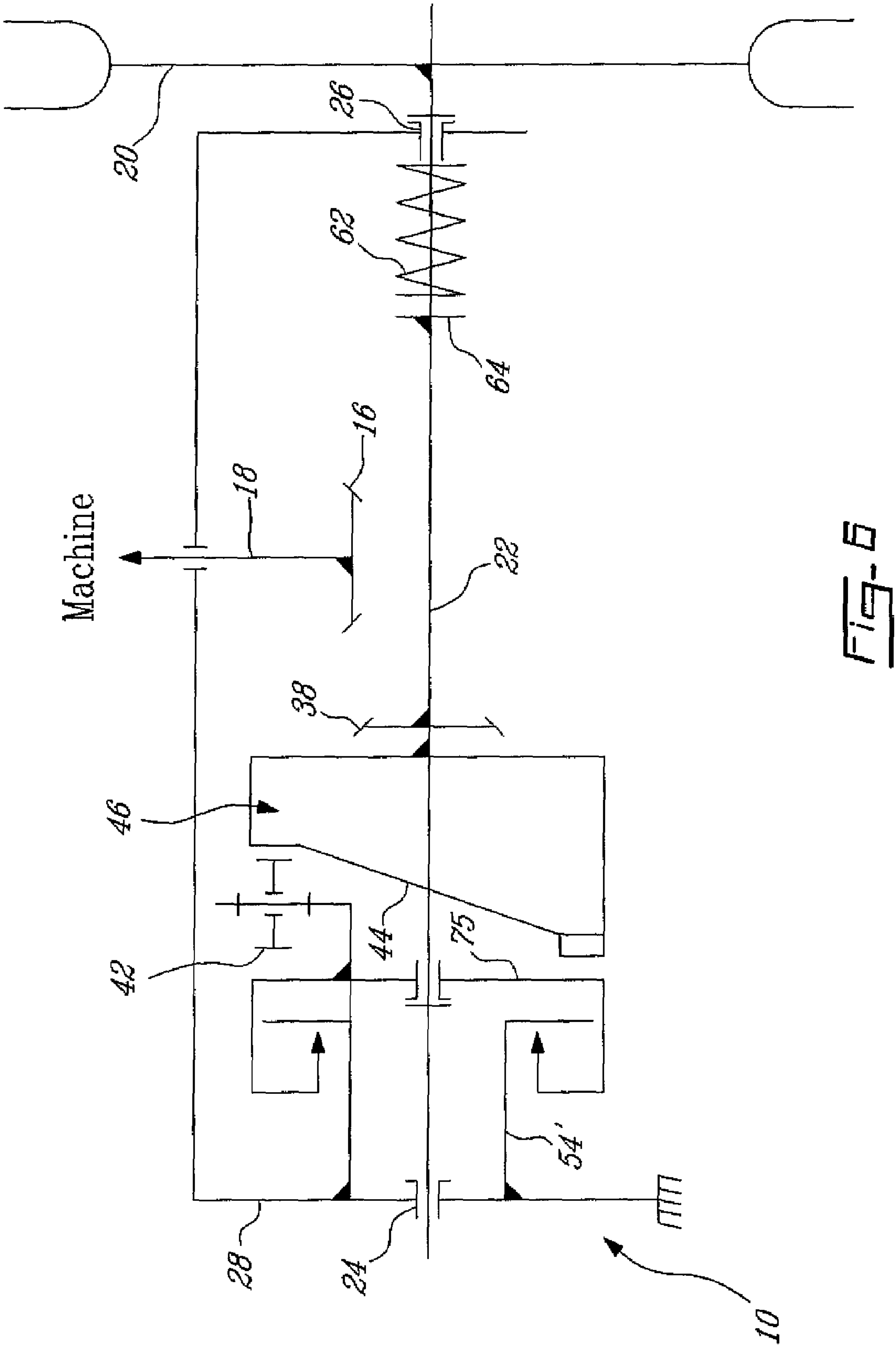
FIG. 6 is a schematic view illustrating a second embodiment of the auxiliary operating device.

FIG. 6 illustrates a second embodiment of the present invention wherein like reference numerals identify like components. The second embodiment essentially differs from the first embodiment in that the cam 46 is mounted for joint movement with the shaft 22 and in that the friction retention forces are applied on a roller support member 75 by means of an axial friction clutch 54'. Rotation of the pulley 20 will cause the shaft and thus the cam to rotate therewith. However, the roller support member 75 will not rotate because of the axial friction forces exerted thereon by friction clutch 54'. The support member 75 will only start to rotate with the shaft 22 when these frictional forces will be overcome, that is when the bevel gear 38 will mesh with the driven gear 16. The relative movement between the cam member 46 and the roller support member 75 will cause the roller to travel on the cam surface, thereby pushing the cam, the shaft and the driving gear 38 to the right against the biasing force of the compression spring 62. When the driving gear 38 engages the driven gear 16, the forces induced on the roller support member 75 via the cam member 46 and the roller 42 Will overcome the anti-rotation friction forces exerted on the roller support member 75 by friction clutch 54', thereby allowing the support member 75 to rotate jointly with the shaft 22. In this way, the driving gear 38 will be maintained in meshing engagement with the driven gear 16 in order to manually operate the closure via the chain (not shown) extending over the pulley 20.

The invention claimed is:

1. An auxiliary operating device for manually operating a normally motor-operated closure between open and closed positions, the device comprising a support structure supporting a shaft, a driving member mounted to said shaft and axially displaceable in translation therewith between an idle position and an operational position wherein the driving member is operatively coupled to the closure, a manual actuator directly fixedly secured to the shaft in direct rotational driving engagement therewith for first displacing said driving member from said idle position to said operational position and then driving said driving member in order to displace the closure, the manual actuator being locked in rotational engagement with the shaft at all times, a cam disposed along said shaft, a cam cam engaging member running on a cam surface of the cam in response to a rotation of the shaft by said manual actuator to displace the driving member from said idle position to said operational position, said cam engaging member being mounted to said shaft separately from said manual actuator and at a distance therefrom, and a clutch for preventing rotation of one of said cam and said cam engaging member while the shaft is axially slid between said idle and operational position, the the manual actuator driving the shaft in rotation throughout the travel of said driving member between said idle and operational positions, wherein said manual actuator is selectively fixedly mountable at either end portions of said shaft irrespectively of the position of said driving member on said shaft, and wherein said shaft is axially displaced relative to said support structure together with the driving member between said idle and operational positions by said manual actuator.

2. An auxiliary operating device as defined in claim 1, wherein said manual actuator is structurally isolated from said driving member, and wherein said manual actuator acts on said driving member via said shaft.

3. An auxiliary operating device as defined in claim 1, wherein said manual actuator includes a pulley fixed to said shaft.

4. An auxiliary operating device as defined in claim 1, wherein a biasing member acts on said shaft to urge said driving member to said idle position thereof.

5. An auxiliary operating device as defined in claim 1, wherein said biasing member includes a spring mounted about the shaft between the support and a collar fixed on the shaft.

6. An auxiliary operating device as defined in claim 1, wherein the cam engaging member is directly rotatably secured to the shaft.

7. An auxiliary operating device as defined in claim 6, wherein said cam is mounted to said shaft, and wherein a clutch acts on said cam to temporarily retain said cam against rotation to allow said manual actuator to axially displace said driving member from said idle position to said operational position.

8. An auxiliary operating device as defined in claim 7, wherein said clutch includes a spring blade extending about the cam to exert a radial friction thereon.

9. An auxiliary operating device as defined in claim 7, wherein said driving member includes a gear fixedly mounted to said shaft for rotational and axial movement therewith.

10. An auxiliary operating device as defined in claim 9, wherein said cam engaging member is mounted to a pin used for mounting said gear to said shaft.

11. An auxiliary operating device as defined in claim 1, wherein the shaft is axially displaced through the interaction between the cam and the cam engaging member against a biasing force of a biasing member.

12. An auxiliary operating device for manually operating a normally motor-operated closure between open and closed positions, comprising a support, a shaft mounted to said support for axial and rotational movement, a driving member mounted to said shaft for joint movement therewith, said driving member being movable between an idle position and an operational position wherein the driving member is operatively coupled to the closure, a manual actuator permanently directly rotatably connected in direct driving relationship with the shaft for driving said shaft in rotation, a cam and a cam engaging engaging member running on said cam, the cam engaging member being mounted to the shaft independently from said manual actuator, one of said cam and said cam engaging member being fixedly secured to the shaft and rotating therewith, the cam engaging member and the cam move relative to one another when the shaft rotates and displace the shaft axially together with the driving member towards the operational position thereof, and a clutch for temporarily drivingly disconnecting said shaft from one of said cam and said cam engaging member while allowing both said cam and said cam engaging member to rotate with the shaft once said driving member assumes said operational position thereof.

13. An auxiliary operating device as defined in claim 12, wherein said cam and said cam engaging member are mounted to said shaft independently of said manual actuator at a distance therefrom along said shaft.

* * * * *